US011883967B2

(12) United States Patent
Douglas

(10) Patent No.: US 11,883,967 B2
(45) Date of Patent: Jan. 30, 2024

(54) LOCKING FOLDABLE KNIFE

(71) Applicant: Good Sportsman Marketing, LLC, Irving, TX (US)

(72) Inventor: Dillon Douglas, Henderson, NV (US)

(73) Assignee: Good Sportsman Marketing, LLC, Irving, TX (US)

( * ) Notice: Subject to any disclaimer, the term of this patent is extended or adjusted under 35 U.S.C. 154(b) by 0 days.

(21) Appl. No.: 17/567,825

(22) Filed: Jan. 3, 2022

(65) Prior Publication Data

US 2022/0297322 A1 Sep. 22, 2022

Related U.S. Application Data

(60) Provisional application No. 63/161,911, filed on Mar. 16, 2021.

(51) Int. Cl.
*B26B 1/04* (2006.01)

(52) U.S. Cl.
CPC .................................... *B26B 1/048* (2013.01)

(58) Field of Classification Search
CPC .... B26B 1/00; B26B 1/02; B26B 1/04; B26B 1/042–046; B26B 1/048
See application file for complete search history.

(56) References Cited

U.S. PATENT DOCUMENTS

| | | | | |
|---|---|---|---|---|
| 4,451,982 | A | 6/1984 | Collins | |
| 5,737,841 | A | 4/1998 | McHenry | |
| 6,145,202 | A | 11/2000 | Onion | |
| 6,751,868 | B2 * | 6/2004 | Glesser | B26B 1/048 30/160 |
| 7,059,053 | B2 * | 6/2006 | Sakai | B26B 1/048 30/160 |
| 7,340,837 | B1 * | 3/2008 | Busse | B26B 1/048 30/160 |
| 7,941,927 | B1 | 5/2011 | Demko | |
| 9,751,221 | B1 * | 9/2017 | Aylsworth | B26B 1/04 |
| 9,751,222 | B2 | 9/2017 | Kao | |
| 10,160,122 | B2 * | 12/2018 | Busse | B26B 1/048 |
| 10,307,916 | B2 * | 6/2019 | Hinderer | B26B 1/10 |
| 10,632,632 | B1 * | 4/2020 | Demko | B26B 1/048 |
| 10,792,823 | B2 * | 10/2020 | Busse | B26B 1/048 |
| 11,130,246 | B2 * | 9/2021 | Busse | B26B 1/042 |
| 11,220,013 | B1 * | 1/2022 | Valerio, II | B26B 1/048 |
| 11,298,837 | B2 | 4/2022 | Hangartner | |
| 2008/0040931 | A1 * | 2/2008 | Demko | B26B 1/042 30/161 |
| 2010/0192381 | A1 * | 8/2010 | Sakai | B26B 1/048 30/160 |
| 2015/0239134 | A1 | 8/2015 | Duey | |
| 2016/0121493 | A1 | 5/2016 | Ikoma | |
| 2016/0354936 | A1 * | 12/2016 | Busse | B26B 1/048 |

* cited by examiner

*Primary Examiner* — Adam J Eiseman
*Assistant Examiner* — Richard D Crosby, Jr.
(74) *Attorney, Agent, or Firm* — Cabello Hall Zinda, PLLC

(57) ABSTRACT

A locking foldable knife with a locking assembly that reliably locks a blade in an extended position for use is disclosed. The locking assembly utilizes the surface area of a shaped peripheral edge at a second end of a blade, together with, confirming structures of a locking bar, and one or more stops to reliably lock a blade in an extended position. A locking assembly also locks a blade in a folded position in one or more embodiments of the locking foldable knife.

14 Claims, 7 Drawing Sheets

LOCKING FOLDABLE KNIFE

CROSS-REFERENCE TO RELATED APPLICATION

This application claims the benefit of U.S. Provisional Patent No. 63/161,911, filed Mar. 16, 2021.

BACKGROUND OF THE INVENTION

Field of the Invention

The invention relates to folding knives and in particular to a locking foldable knife.

Related Art

Folding knives are often desirable because they provide a blade that can be extended for use and folded for storage and carrying. This provides convenience as well as utility. A variety of locking mechanisms have been developed to prevent the blade from folding while extended for use.

For example, U.S. Pat. Nos. 4,451,982 and 7,914,927 describe a sliding member that extends to engage and lock a blade in position. U.S. Pat. Nos. 6,761,868 and 5,737,841 describe a spherical or cylindrical member that slides to engage and lock a blade in position. U.S. Pat. No. 10,632,632 and U.S. Patent Publication No. 2008/0040931 describe a pivoting member that pivots to engage and lock a blade in position.

From the discussion that follows, it will become apparent that the present invention addresses the deficiencies associated with the prior art while providing numerous additional advantages and benefits not contemplated or possible with prior art constructions.

SUMMARY OF THE INVENTION

A locking foldable knife is disclosed herein. As will be described further below, the locking foldable knife reliably locks a blade in an extended position, a folded position, or both through its locking assembly. The locking assembly comprises a variety of shaped structures to provide the surface area to reliably lock a blade in position.

Various embodiments of a locking foldable knife are disclosed. For instance, in one exemplary embodiment, a locking foldable knife comprises a handle and a blade rotatably mounted to the handle at the blade's second end. The blade comprises a first end and a second end. The first end comprises one or more cutting edges and the second end has a shaped periphery. The shaped periphery has a plurality of locking edges and at least one interstitial edge therebetween;

A locking bar is slidable along an axis between an extended position and retracted position relative to the handle, and a stop is secured to the handle proximate a distal end of the locking bar and positioned along the axis. A portion of the locking bar at the distal end of the locking bar is received between at least one of the locking edges and the stop when the locking bar is in the extended position, and the locking bar is disengaged from the locking edges when the locking bar is in the retracted position.

The locking foldable knife may include a slot formed in the shaped periphery adjacent at least one of the locking edges. In addition, the portion of the locking bar may also be received in the slot when the locking bar is in the extended position. At least one of the locking edges may engage a locking edge of the locking bar when the blade is in a fully extended or fully retracted state.

The portion of the locking bar may be an outwardly extending tab. An additional tab may be formed at a distal end of the locking bar. In such embodiments, the stop may be received between the tab and the additional tab when the locking bar is in the extended position. An additional stop may also be secured to the handle and aligned with the stop along the axis.

In another exemplary embodiment, a locking assembly for a foldable knife having a handle and a blade is disclosed. The locking assembly comprises a proximal end of the blade that has a plurality of locking edges and an interstitial edge therebetween. The blade is rotatably mounted to the handle at the proximal end of the blade.

A locking bar is slidable along an axis between an extended position and retracted position relative to the handle, and a stop is secured to the handle proximate a distal end of the locking bar and positioned along the axis. A portion of the locking bar at the distal end of the locking bar is received between at least one of the locking edges and the stop when the locking bar is in the extended position, and the locking bar is disengaged from the locking edges when the locking bar is in the retracted position. The locking edges and the at least one interstitial edge may be distinct in shape.

A slot may be formed in the proximal end of the blade adjacent at least one of the locking edges. The portion of the locking bar may also be received in the slot when the locking bar is in the extended position.

At least one of the locking edges may engage a locking edge of the locking bar when the blade is in an extended or retracted state. In addition, at least an edge of the locking bar and the locking edges may have corresponding shapes. An additional stop may be secured to the handle and aligned with the stop along the axis as well. A biasing device may be provided to force the locking bar towards the extended position.

Various methods for a locking foldable knife are disclosed herein as well. For instance, in on exemplary embodiment, a method for providing a locking foldable knife comprises rotatably mounting a proximal end of a blade to a handle of the locking foldable knife. The proximal end of the blade comprises a plurality of straight edges and at least one curved edge therebetween.

A locking bar is slidably mounted to the handle and slidable along an axis between an extended position and retracted position, and a stop is attached to the handle proximate a distal end of the locking bar and positioned along the axis.

A portion of the locking bar at the distal end of the locking bar is received between at least one of the locking edges and the stop when the locking bar is in the extended position, and the locking bar is disengaged from the locking edges when the locking bar is in the retracted position.

A slot may be formed in the proximal end of the blade adjacent at least one of the locking edges. The portion of the locking bar may also be received in the slot when the locking bar is in the extended position. At least one of the locking edges may engage a locking edge of the locking bar when the blade is in an extended or retracted state. An additional stop may be attached to the handle and aligned with the stop along the axis.

The portion of the locking bar may be an outwardly extending tab. An additional tab may be formed at a distal end of the locking bar, such that the stop is received between the tab and the additional tab when the locking bar is in the extended position.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

As will become apparent from the disclosure herein, the locking foldable knife provides a locking assembly to reliably lock its blade in position. The locking assembly reduces the risk of accidental closure while also maintaining the convenience of a folding knife.

Figure 1:
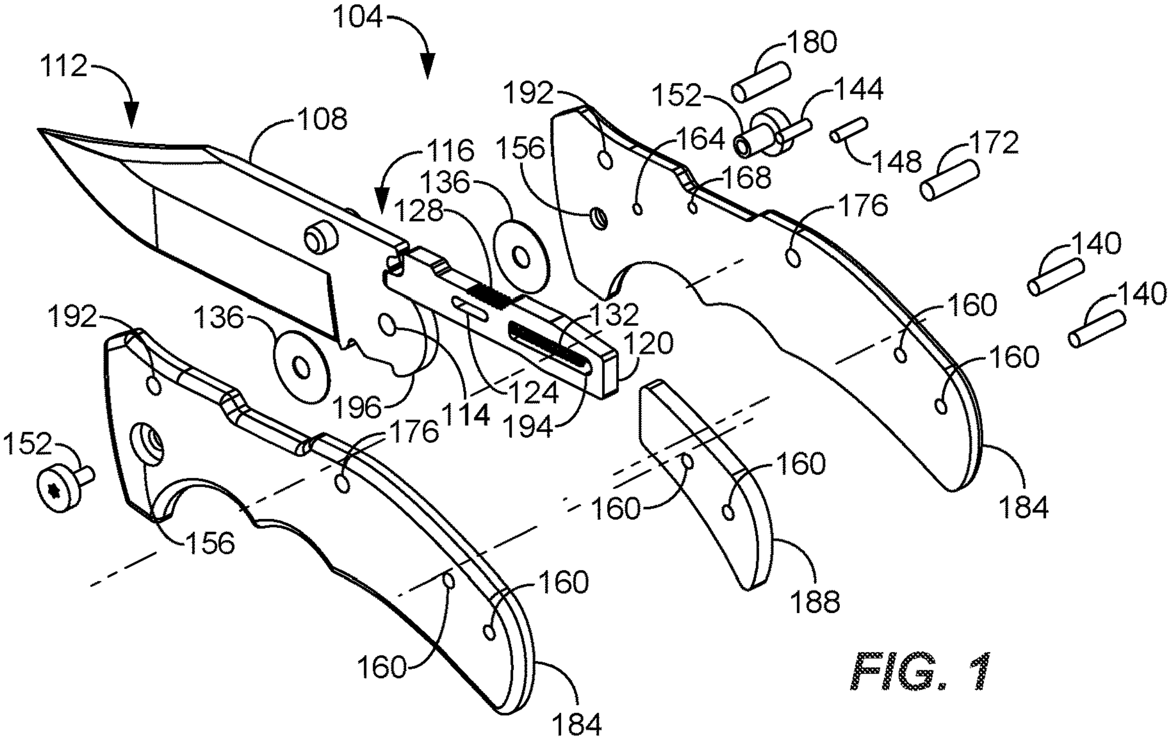
FIG. 1 is an exploded view of an exemplary locking foldable knife.

FIG. 1 illustrates an exploded view of an exemplary locking foldable knife 104. A locking foldable knife 104 will typically comprise a blade 108 having a first end 112 and a second end 116. In one or more embodiments, the first end 112 will typically comprise one or more cutting edges while the second end 116 typically comprises a shaped peripheral edge 196 for, among other things, locking the blade, as will be described further below.

Figure 2:
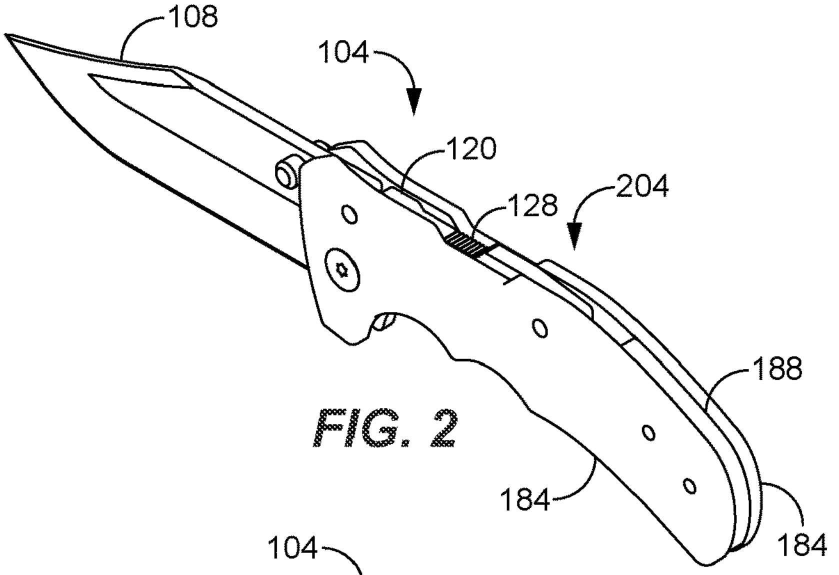
FIG. 2 is a perspective view of an exemplary locking foldable knife in an extended state.
Figure 3:
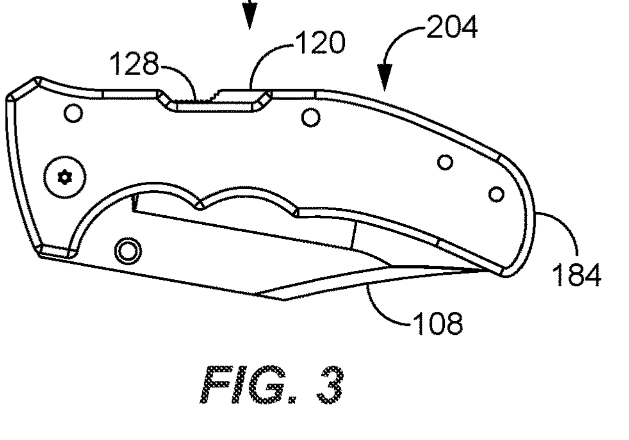
FIG. 3 is a side view of an exemplary locking foldable knife in a folded state.

Referring to FIGS. 2-3, it can be seen that the blade 108 may be secured to a handle 204 and extend and fold relative to the same. A handle 204 may comprise one or more portions 184, one or more handle spacers 188, or both. As shown in FIG. 1 for example, the handle 204 comprises a first and second portions 184 that form the lateral sides of the handle 204. It is noted that one or more portions of a handle 204 may be contoured, such as to form a hand grip, allow access to elements of the locking foldable knife 104, or both.

One or more fasteners 140 may be used to assemble the locking foldable knife 104. As shown in FIG. 1 for example, fasteners 140 comprising pins engage corresponding apertures 160 to assemble the locking foldable knife 104. Though shown as mechanical fasteners, it is contemplated that a fastener may also be one or more adhesives, welds, or the like.

A blade 104 may be rotatably secured to a handle 204 via one or more rotatable mounts. In one or more embodiments, a rotatable mount may comprise a pivot 152. As shown in FIG. 1 for example, a pivot 152 extends between one or more portions 184 of the handle 204 and through a hub 114 of the blade 108 to allow the blade to rotate at the pivot. It is noted that in FIG. 1, the pivot 152 extends through and is secured by one or more corresponding apertures 156 in the handle 204. One or more blade spacers 136 may be provided to facilitate rotation of the blade 108.

As stated above, the second end 116 of a blade 108 will typically comprise a shaped peripheral edge 196. The shaped peripheral edge 196 facilitates locking of the blade. In one or more embodiments, a shaped peripheral edge 196, or a portion thereof, will engage and disengage a locking bar 120 to lock or unlock a blade 108.

A shaped peripheral edge 196 may also comprise structural features that limit the extent to which a blade 108 may be extended, folded, or both. As will be described further below, a shaped peripheral edge 196 may engage an extension stop 180, a folding stop 144, or both, thereby preventing further extension or folding, respectively speaking. In one or more embodiments, an extension stop 180, folding stop 144, or both may be secured to one or more portions 184 of a handle 204, such as at one or more corresponding apertures 192, 164 thereof.

A locking bar 120 may comprise one or more guides 124 that, together with one or more mating guides 148, guide the movement of the locking bar. As shown in FIG. 1, the mating guide 148 is in the form of a pin that engages the guide 124, which is in the form of a slot, to control lateral movement of the locking bar 120. In the embodiment of FIG. 1, the mating guide 148 is secured to one or more portions 184 of the handle 204 at one or more corresponding apertures 168 thereof.

As stated, a locking bar 120 will typically be slidably mounted, such as within a handle 204 of a locking foldable knife 104. As can be seen in FIGS. 1 and 2, a handle spacer 188 provides lateral separation of the portions 184 of the handle 204, forming a compartment in the handle within which the locking bar 120 can slide. A user engagement portion 128, which may be textured, of the locking bar 120 is externally accessible to allow a user to engage and change the position of the locking bar.

A locking bar 120 will typically also comprise one or more biasing devices 132 to bias the locking bar toward a particular position, or both. As can be seen in FIG. 1, a biasing device 132 may comprise a spring or the like, which may be housed in a section, such as a cavity 194, of a locking bar 120. An anchor 172 may be provided to secure an end or other portion of a biasing device 132, thereby allowing the biasing device to apply a force relative to its secured portion.

As shown in FIG. 1, an anchor 172 secures a portion of the biasing device 132 to one or more portions 184 of a handle 204. In the embodiment of FIG. 1, the anchor 172 is a pin that is secured at one or more corresponding apertures 176 of one or more portions 184 of the handle 204. In one or more embodiments, the biasing device 132 applies a force that forces the locking bar 120 toward the blade 108, which biases the locking bar to an extended position.

Figure 4:
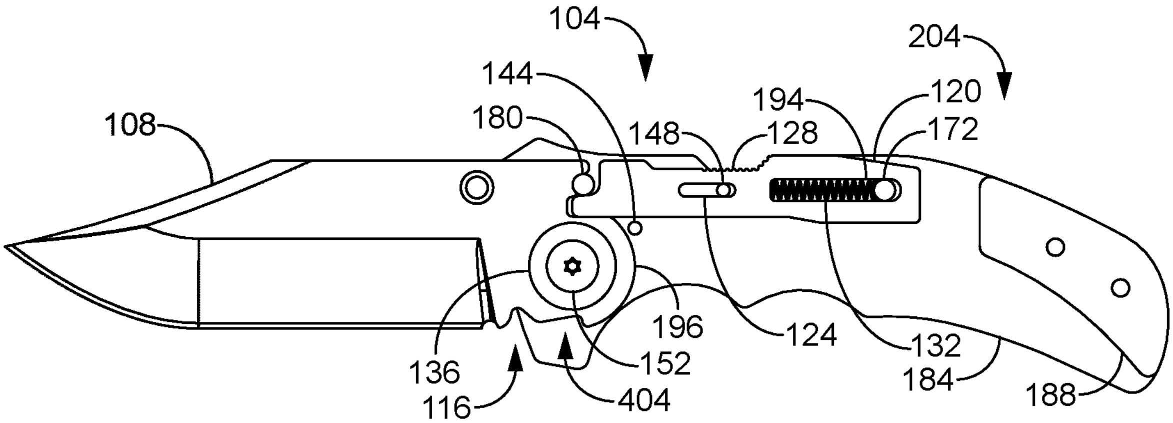
FIG. 4 is a side cross-sectional view of an exemplary locking foldable knife in a locked state.
Figure 5:
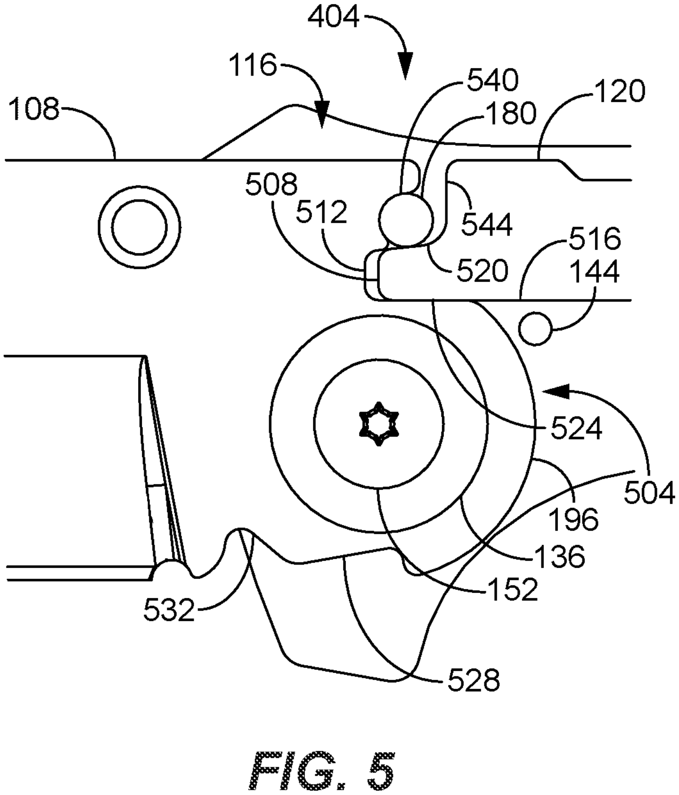
FIG. 5 is a side cross-sectional view of an exemplary locking assembly.
Figure 6:
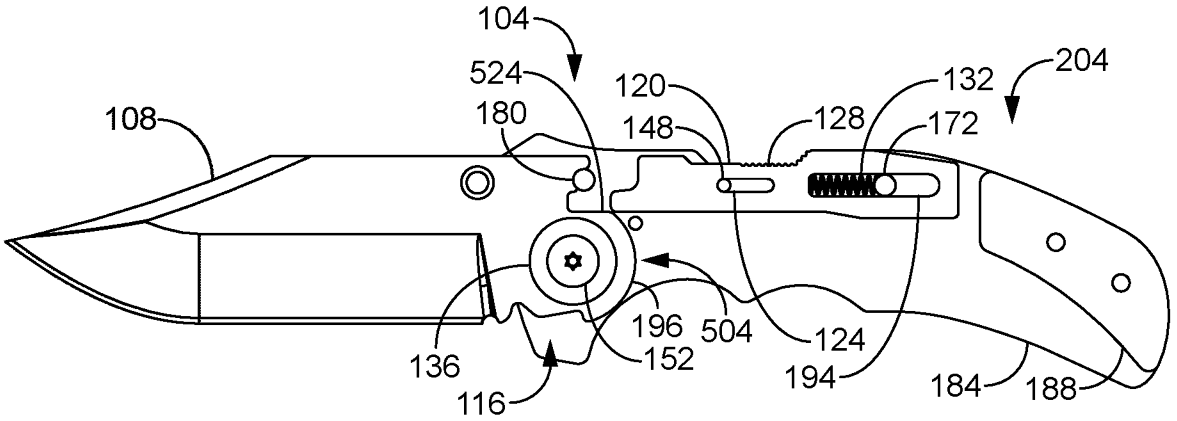
FIG. 6 is a side cross-sectional view of an exemplary locking foldable knife in an unlocked state.
Figure 7:
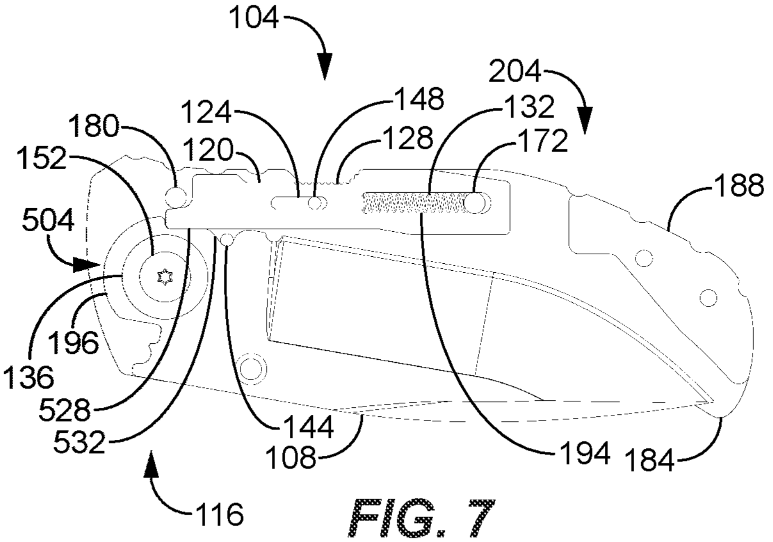
FIG. 7 is a side cross-sectional view of an exemplary locking foldable knife in a locked state.

Operation of a locking foldable knife 104 will now be described with respect to FIGS. 4-7, whereby FIGS. 4 and 5 illustrate the locking foldable knife 104 in a locked state while in an extended state, FIG. 6 illustrates the locking foldable knife in an unlocked state while in an extended state, and FIG. 7 illustrates the locking foldable knife in a locked stated while being folded. In the illustrated unlocked state of FIG. 6, the blade 108 is shown in an extended position; however, it will be understood from the disclosure herein that a locking foldable knife 104 may be unlocked while in its folded state to allow transition to an extended state.

A detail view of the exemplary locking assembly 404 is shown in FIG. 5. As can be seen, the shaped peripheral edge 196 of a blade 108 may comprise one or more locking edges 524, 528, one or more interstitial edges 504, or both. In one or more embodiments, an interstitial edge 504 will be formed between two locking edges 524, 528. In general, a locking bar 120 will traverse an interstitial edge 504 as the locking foldable knife 104 is placed in its extended or folded states. One or more receiving edges 532, 540 may be provided as well to engage an extension stop 180, folding stop 144, or both to limit the extent of extension and folding that can occur.

A locking edge 524, 528 engages a locking bar 120 to lock a blade 108 in position, such as shown in FIGS. 4 and 5. In one or more embodiments, a locking edge 524, 528 may be shaped to conform to the locking edge 516 of a locking bar 120. These mating surface areas allow the blade 108 to be robustly locked in position with little or no movement once locked.

As can be seen, an interstitial edge 504 may be arcuate while one or more locking edges are substantially linear.

An outward extending tab 508 and corresponding slot 512 that receives the tab may be provided to further the reliability of the lock. A tab 508 and slot 512 may, respectively, be at a second end 116 of a blade 108 and a locking bar 120, or vice versa. As shown in FIG. 5 for example, a slot 512 is formed in the shaped peripheral edge 196 of the blade 108 at the second end 116 thereof, and a corresponding tab 508 is provided at a distal end 544 of the locking bar 120.

When locked, a tab 508 may be received in a slot 512 further adding to the surface area of engagement between a blade 108 and locking bar 120, increasing the robustness of the lock. The increased strength of the lock reduces the likelihood of lock failure, such as due to force applied on the blade 108 during use. As can be seen, a tab 508 and slot 512 may have conforming shapes to increase the surface area of engagement.

It is noted that a locking bar 120 may engage an extension stop 180 when extended. In one or more embodiments, this engagement limits the extension of the locking bar 120 and may be used to prevent a tab 508 or other portion of the locking bar from advancing into a slot 512 beyond a particular threshold. The locking bar 120 may be prevented from becoming lodged in the slot 512 in this manner.

FIGS. 4 and 5 also show that an extension stop 180 prevents the locking bar 120 from moving perpendicularly to the locking bar's longitudinal axis by engaging at least the distal end 544 of the locking bar when the locking bar is extended into a locked position. A portion 520 of the locking bar 120, namely its tab 508, may be received between an extension stop 180 and a locking edge 524, 528 of the blade 108, when locked. In this manner, the locking bar 120 is prevented from moving perpendicularly to its longitudinal axis and the blade 108 accordingly cannot be folded unless the locking bar 120 is retracted.

In FIG. 4, the locking bar 120 is in an extended position thereby locking the blade 108 in the extended state shown therein. The biasing device 132 applies a force to maintain the extended position of the locking bar 120. The force applied by a biasing device 132 may be overcome by a user to retract the locking bar 120. For example, in FIG. 6, the locking bar 120 is retracted to unlock the blade 108, compressing the biasing device 132.

When retracted, the locking bar 120 is disengaged from the locking edge 524, which unlocks the blade 108 and allows the blade to be rotated. The locking bar 120 may traverse the interstitial edge 504, in engagement or adjacent with the interstitial edge, as the blade 108 is rotated, such as to arrive at another locking edge 528 thereby locking the blade in a folded state, as shown in FIG. 7.

As can be seen, a locking bar 120 may be retracted to unlock the blade 108, to allow the blade 108 to move between the extended state and folded state. The locking bar 120 may then be extended to lock the blade 108 in the desired state.

Figure 8:
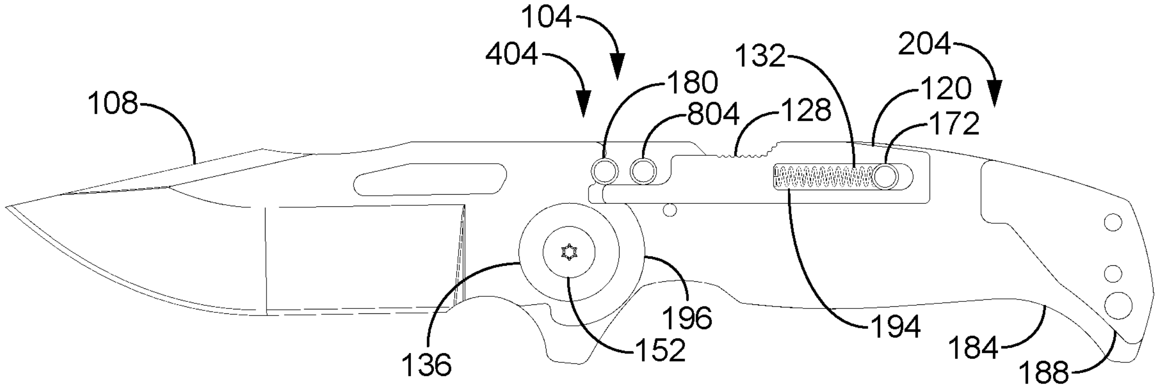
FIG. 8 is a side cross-sectional view of an exemplary locking foldable knife

FIG. 8 illustrates an embodiment of a locking foldable knife 104 having a locking assembly 404 with an additional stop 804. An additional stop 804 reinforces the locking assembly 404 by providing additional structure to prevent the locking bar 120 from moving perpendicularly to its longitudinal axis, which reduces the likelihood of the blade 108 folding while locked. Similar to an extension stop 180, the additional stop 804 may engage a locking bar 120 when the locking bar is extended, limiting the extension of the locking bar.

Figure 9:
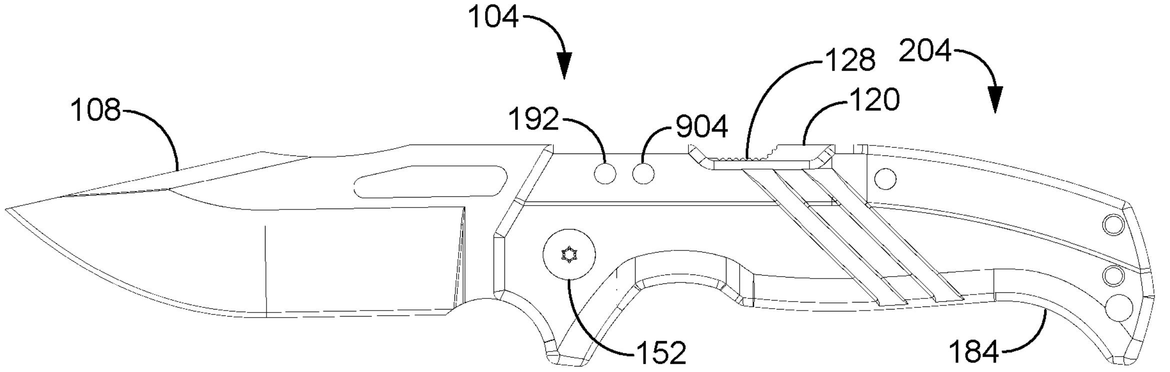
FIG. 9 is a side view of an exemplary locking foldable knife.

FIG. 9 illustrates a side view of such embodiment. As can be seen, an additional stop 804 may be secured to one or more apertures 904 of one or more portions 184 of a locking foldable knife's handle 204.

Figure 10:
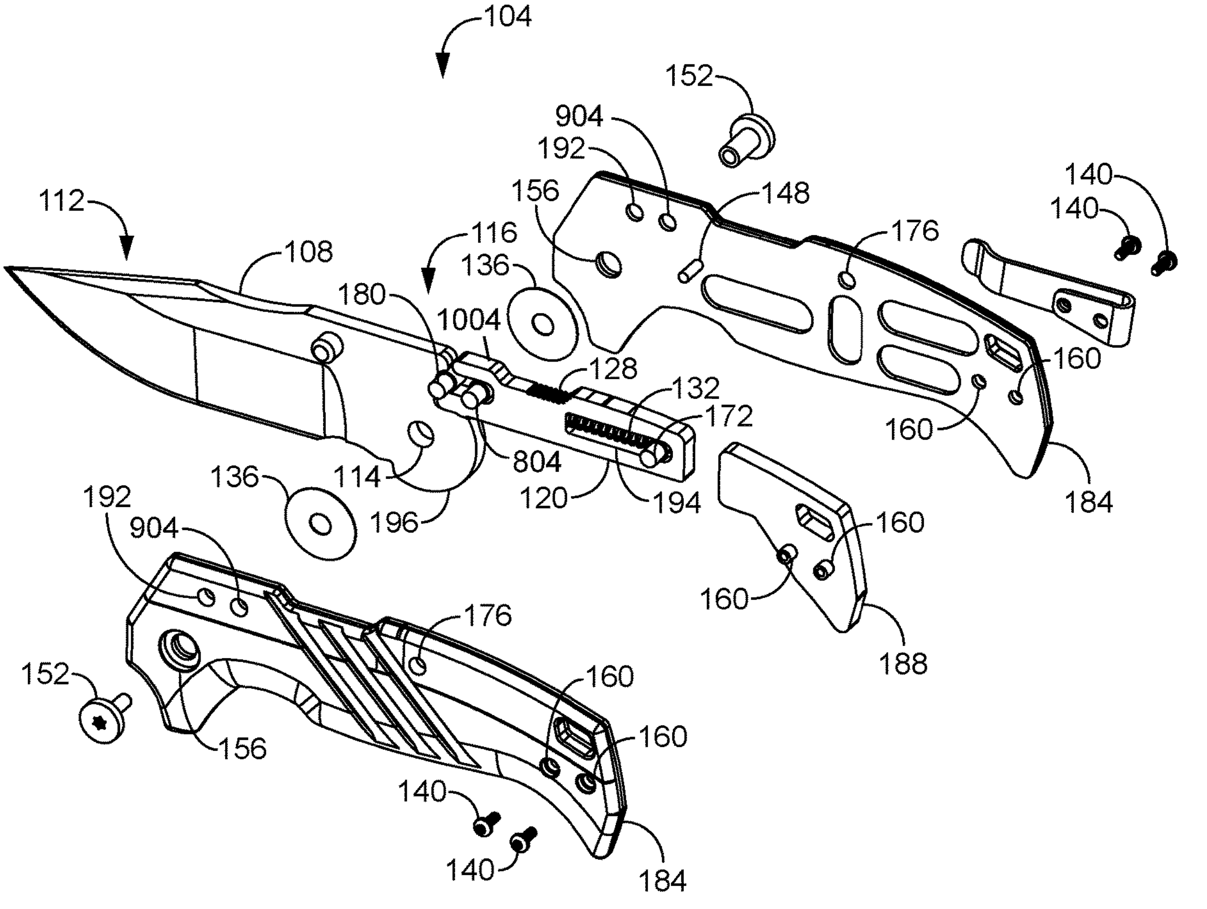
FIG. 10 is an exploded view of an exemplary locking foldable knife.
Figure 11:
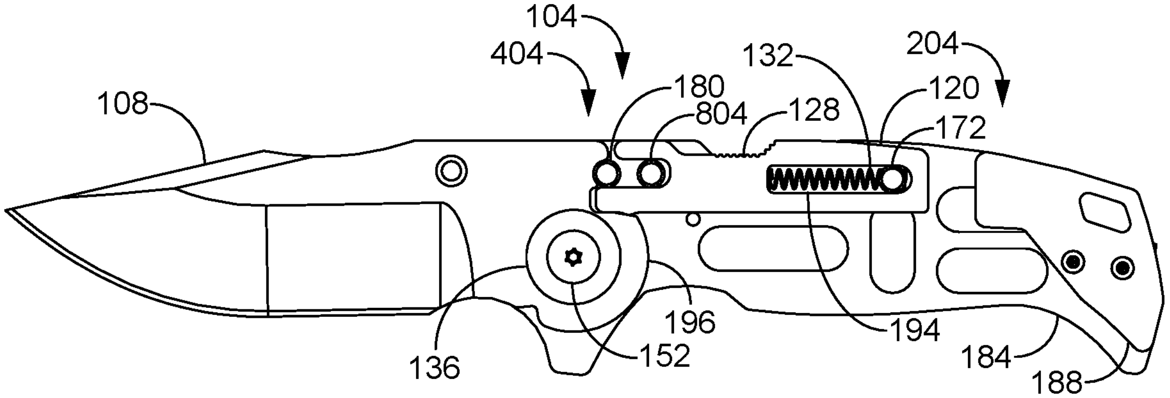
FIG. 11 is a side cross-sectional view of an exemplary locking foldable knife in an unlocked state.
Figure 12:
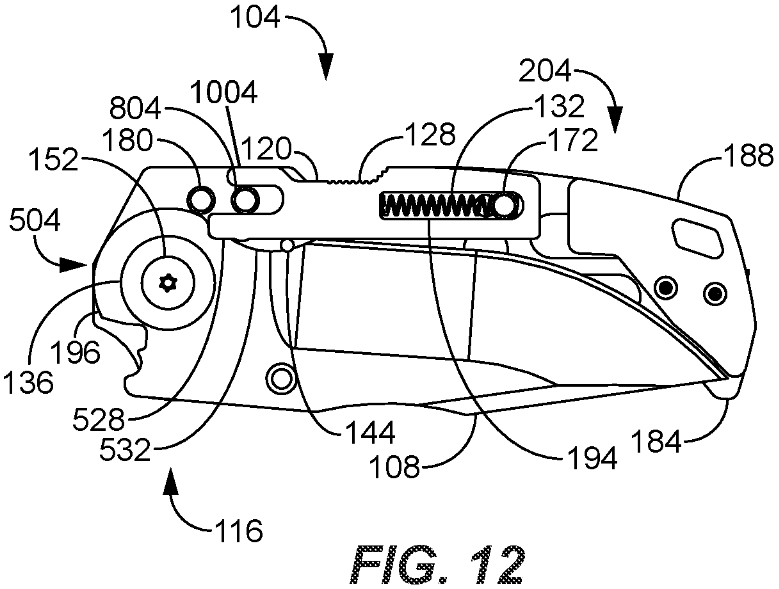
FIG. 12 is a side cross-sectional view of an exemplary locking foldable knife in a locked state.

FIGS. 10-14 illustrate an embodiment of a locking foldable knife 104 having a locking assembly 404 with an additional stop 804 as well as an additional tab 1004. It is noted that various combinations of one or more stops 180, 804 and one or more tabs 508, 1004 may be provided in different embodiments of the locking foldable knife 104. FIGS. 11 and 12 illustrate the locking foldable knife 104 in a locked state, with FIG. 11 illustrating an extended state and FIG. 12 illustrating a folded state.

Similar to an additional stop, an additional tab 1004 reinforces the locking assembly 404 by providing additional structure to prevent lock failure. As can be seen in FIG. 10, the additional tab 1004 may engage a proximal portion of a blade 108, one or more stops 180, 804, or both to further prevent the blade from becoming overextended.

Figure 13:
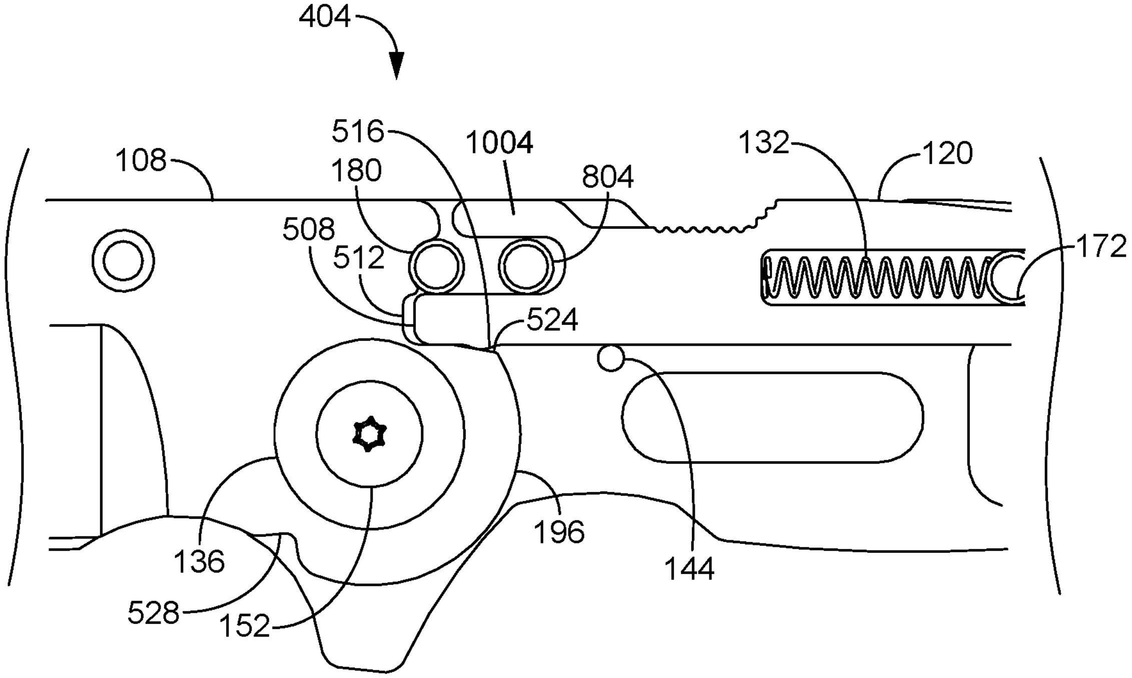
FIG. 13 is a side cross-sectional view of an exemplary locking assembly.
Figure 14:
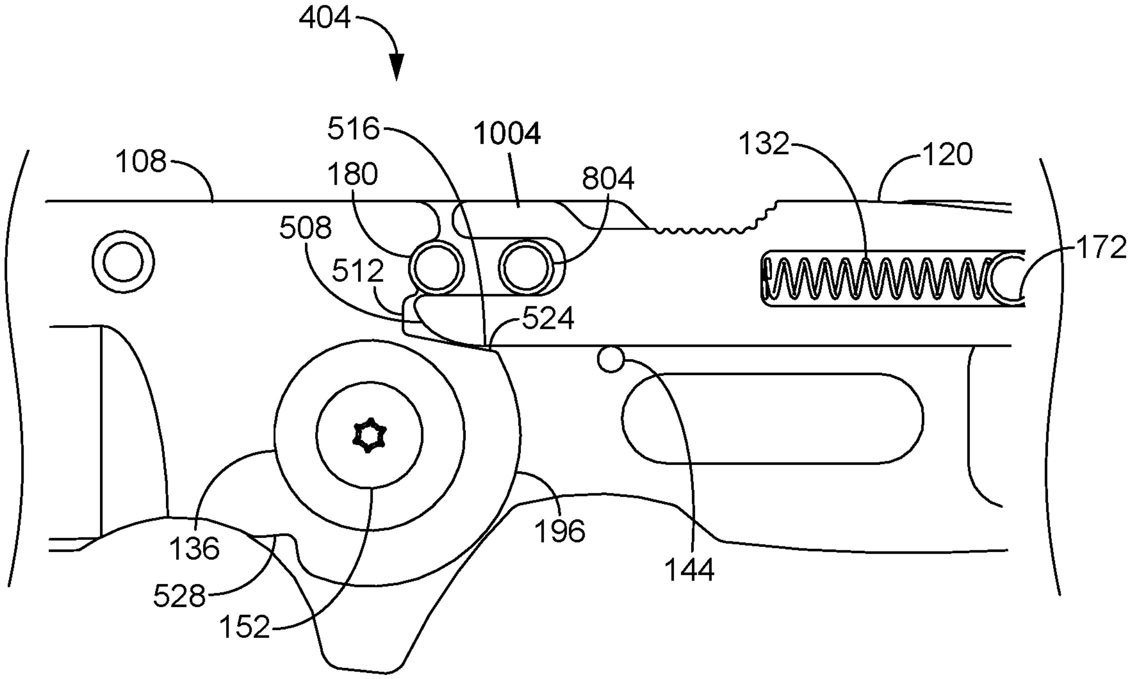
FIG. 14 is a side cross-sectional view of an exemplary locking assembly.

It is noted that a locking bar 120, a shaped peripheral edge 196, or both may have various shapes. As shown in the detail views of FIGS. 13 and 14 for example, a locking edge 516 of a locking bar 120 may comprise one or more contoured portions. FIG. 13 illustrates an exemplary embodiment having an outwardly extending protrusion in the locking edge 516, while FIG. 14 illustrates an exemplary embodiment having a curved locking edge. A locking edge 524 of a shaped peripheral edge 196 may be shaped to accommodate the same. As can be seen in FIGS. 13 and 14, a locking edge 524 of a shaped peripheral edge 196 may be angled to engage a locking edge 516 of a locking bar 120.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A locking foldable knife comprising:

a blade having a first end and a second end, wherein the first end comprises one or more cutting edges and the second end comprises a shaped periphery, the shaped periphery comprising a plurality of locking edges and at least one interstitial edge therebetween;

a handle, wherein the blade is rotatably mounted to the handle at the second end;

a locking bar slidable along an axis between an extended position and retracted position relative to the handle; and a stop secured to the handle proximate a distal end of the locking bar and positioned along the axis;

wherein an exterior portion of the locking bar at the distal end of the locking bar engages at least one of the plurality of locking edges and the stop when the locking bar is in the extended position, and wherein the locking bar is disengaged from the plurality of locking edges when the locking bar is in the retracted position.

2. The locking foldable knife of claim 1, further comprising a slot formed in the shaped periphery adjacent at least one of the plurality of locking edges, the slot oriented perpendicular to the axis.

3. The locking foldable knife of claim 2, wherein the portion of the locking bar is also received in the slot when the locking bar is in the extended position.

4. The locking foldable knife of claim 1, wherein the portion of the locking bar is an outwardly extending tab.

5. The locking foldable knife of claim 4, further comprising an additional tab at the distal end of the locking bar, wherein the outwardly extending tab and the additional tab have freestanding ends and the stop is received between the tab and the additional tab when the locking bar is in the extended position.

6. The locking foldable knife of claim 1, further comprising an additional stop secured to the handle and aligned with the stop along the axis.

7. The locking foldable knife of claim 1, wherein at least one of the plurality of locking edges engages a locking edge of the locking bar when the blade is in a fully extended or fully retracted state.

8. A locking foldable knife comprising:

a blade having a proximal end comprising a plurality of locking edges and an interstitial edge therebetween, wherein the blade is rotatably mounted to a handle at the proximal end of the blade;

a locking bar slidable along an axis between an extended position and a retracted position relative to the handle of the foldable knife; and a stop secured to the handle proximate a distal end of the locking bar and positioned along the axis;

wherein an exterior portion of the locking bar at the distal end of the locking bar engages at least one of the plurality of locking edges and the stop when the locking bar is in the extended position, and wherein the locking bar is disengaged from the plurality of locking edges when the locking bar is in the retracted position.

9. The locking foldable knife of claim 8, further comprising a slot formed in the proximal end of the blade adjacent at least one of the plurality of locking edges, the slot oriented perpendicular to the axis, wherein the portion of the locking bar is also received in the slot when the locking bar is in the extended position.

10. The locking foldable knife of claim 8, wherein at least one of the plurality of locking edges engages a locking edge of the locking bar when the blade is in an extended or retracted state.

11. The locking foldable knife of claim 8, wherein at least an edge of the locking bar and the plurality of locking edges have corresponding shapes.

12. The locking foldable knife of claim 8, further comprising an additional stop secured to the handle and aligned with the stop along the axis.

13. The locking foldable knife of claim 8, wherein the locking edges and the interstitial edge are distinct in shape.

14. The locking foldable knife of claim 8, further comprising a spring that biases the locking bar towards the extended position.

* * * * *